US010812511B2

(12) United States Patent
Bihannic et al.

(10) Patent No.: US 10,812,511 B2
(45) Date of Patent: Oct. 20, 2020

(54) METHOD FOR PROCESSING A NETWORK SERVICE

(71) Applicant: Orange, Paris (FR)

(72) Inventors: Nicolas Bihannic, Trebeurden (FR); Gael Fromentoux, Pleumeur Bodou (FR); Frederic Fieau, Paris (FR)

(73) Assignee: ORANGE, Paris (FR)

( * ) Notice: Subject to any disclaimer, the term of this patent is extended or adjusted under 35 U.S.C. 154(b) by 189 days.

(21) Appl. No.: 16/067,496

(22) PCT Filed: Dec. 22, 2016

(86) PCT No.: PCT/FR2016/053633
§ 371 (c)(1),
(2) Date: Jun. 29, 2018

(87) PCT Pub. No.: WO2017/115037
PCT Pub. Date: Jul. 6, 2017

(65) Prior Publication Data
US 2019/0028502 A1 Jan. 24, 2019

(30) Foreign Application Priority Data
Dec. 30, 2015 (FR) .................... 15 63474

(51) Int. Cl.
H04L 29/06 (2006.01)
(52) U.S. Cl.
CPC ...... H04L 63/1425 (2013.01); H04L 63/1416 (2013.01); H04L 63/1441 (2013.01); H04L 63/1491 (2013.01)

(58) Field of Classification Search
CPC ............. H04L 63/1425; H04L 63/1416; H04L 63/1441; H04L 63/1491; H04L 63/1458;
(Continued)

(56) References Cited

U.S. PATENT DOCUMENTS

2014/0283051 A1 9/2014 Doron et al.
2015/0033340 A1 1/2015 Giokas
(Continued)

OTHER PUBLICATIONS

International Search Report dated Feb. 28, 2017, for corresponding International Application No. PCT/FR2016/053633, filed Dec. 22, 2016.
(Continued)

Primary Examiner — Izunna Okeke
(74) Attorney, Agent, or Firm — David D. Brush; Westman, Champlin & Koehler, P.A.

(57) ABSTRACT

A method for processing a network service supported by a network infrastructure allowing virtualization of network functions. The network service is made up of a sequence, called an initial sequence, of at least one virtualized network function processing an incoming stream. The method includes: detecting an anomaly relating to the at least one virtualized network function; on the basis of the anomaly, detecting and identifying a network attack targeting the network service; identifying, in the initial sequence, at least one virtualized network function impacted by the attack; modifying the initial sequence so as to circumscribe the attack in such a way that the incoming stream is routed towards at least one virtualized network function, called the curative function, carrying out a processing of the incoming stream, called the malicious stream, as well as of functions implemented by the at least one virtualized network function impacted by the attack.

9 Claims, 3 Drawing Sheets

(58) Field of Classification Search
CPC .................. H04L 2463/144; H04L 43/0888; H04L 43/50
See application file for complete search history.

(56) References Cited

U.S. PATENT DOCUMENTS

| | | |
|---|---|---|
| 2015/0341377 A1 | 11/2015 | Kasturi et al. |
| 2017/0237641 A1* | 8/2017 | Holeman ............ G06F 9/45558 709/224 |
| 2017/0237760 A1* | 8/2017 | Holeman ............ G06F 9/45558 726/22 |
| 2018/0054458 A1* | 2/2018 | Marck ................. H04L 63/1458 |

OTHER PUBLICATIONS

Written Opinion of the International Searching Authority dated Feb. 28, 2017, for corresponding International Application No. PCT/FR2016/053633, filed Dec. 22, 2016.

English Translation of Written Opinion of the International Searching Authority dated Feb. 28, 2017, for corresponding International Application No. PCT/FR2016/053633, filed Dec. 22, 2016.

"Network Functions Virtualisation (NFV); Ecosystem; Report on SDN Usage in NFV Architectural Framework; Draft ETSI GS NFV-EVE 005". ETSI Draft, European Telecommunications Standards Institute (ETSI), vol. ISG-NFV, No. V0.2.0. Sep. 29, 2015.

"Network Functions Virtualisation (NFV); Management and Orchestration", ETSI specification, version 1.1.1. Dec. 2014 and the document 3. "GS NFV-MAN 001", ETSI specification. Dec. 2014.

* cited by examiner

METHOD FOR PROCESSING A NETWORK SERVICE

CROSS-REFERENCE TO RELATED APPLICATIONS

This Application is a Section 371 National Stage Application of International Application No. PCT/FR2016/053633, filed Dec. 22, 2016, the content of which is incorporated herein by reference in its entirety, and published as WO 2017/115037 on Jul. 6, 2018, not in English.

FIELD OF THE DISCLOSURE

The invention lies in the field of telecommunication networks, and relates more particularly to a method for processing a network service in a cloud infrastructure in the case of a network attack.

BACKGROUND OF THE DISCLOSURE

At the start of 2013, the ETSI (European Telecommunications Standards Institute) standardization organization launched a project called NFV (Network Functions Virtualization) to establish, between the experts of the telecommunications and information technologies sectors, the first specifications in the field of the virtualization (that is to say the dematerialization) of the functions used in the telecommunications networks, hereinafter called virtualized network functions (VNF). These virtualized network functions denote, for example, the functions implemented by a virtualized mobility management entity (MME), a gateway (e.g. P-GW, for "PDN Gateway"), a firewall, etc.

The virtualization of the network functions is performed by infrastructures commonly called "cloud" infrastructures, which implement and host these functions on virtual machines that can be accessed for example via a network application. These virtual machines use remote hardware computing and network resources (e.g. network connectivity, computation power, storage spaces, servers, applications, etc.), managed by the cloud infrastructure, and pooled between its various clients according to their respective needs. The clients can thus access these resources without having to administer the underlying infrastructure managing these resources, which is often complex.

Together, the virtualized network functions form network services corresponding for example to an IMS (IP Multimedia Subsystem) core network, a content distribution network (or CDN), or even an EPC (Evolved Packet Core) network core. These network services are created by an orchestration entity which, for each of them, creates a graph, called "Forwarding Graph", representing virtualized network functions, the connections between these functions and the order in which incoming traffic is subjected to these virtualized network functions in order to provide the service concerned.

The cloud infrastructures are, like any network infrastructure, likely to be the subject of network attacks. These attacks are in particular designed to compromise a network service implemented by such a cloud infrastructure. As defined currently in an ETSI specification document entitled "Network Functions Virtualisation (NFV); Management and Orchestration", version 1.1.1 dated December 2014, notifications of "Virtual resources fault management" type can be transmitted by Virtualized Infrastructure Management (VIM, for Virtual Infrastructure Management per the NFV terminology) entities to an orchestration entity (called NFVO, for "NFV Orchestrator" per the NFV terminology) or to VNF management entities (called VNFM, for VNF Manager). These notifications make it possible to identify one or more occurrences of anomalies but the virtualized infrastructure management entities do not have the knowledge of the sequence of virtualized network functions of a network service needed to correlate events associated with a given stream. The notifications of "Virtual resources fault management" type do not make it possible to determine if an anomaly amounts to a network attack. A network attack is thus likely not to be processed correctly, which can have heavy repercussions on the network service that is the target of the attack and on the network supporting this service (e.g. loss of control of one or more entities of the network, leaking of confidential information on the subscribers of the network).

SUMMARY

One of the aims of the invention is to remedy the inadequacies/drawbacks of the prior art and/or to provide improvements thereto.

According to a first aspect, the invention relates to a method for processing a network service supported by a network infrastructure allowing the virtualization of network functions, the network service being formed by a sequence, called initial sequence, of at least one virtualized network function processing an incoming stream. The method comprises the following steps:
- detection of an anomaly relating to the at least one virtualized network function;
- detection and identification of a network attack targeting the network service on the basis of the anomaly;
- identification in the initial sequence of at least one virtualized network function impacted by the attack;
- modification of the initial sequence to circumscribe the attack such that the incoming stream is routed to at least one virtualized network function, called curative function, implementing a processing of the incoming stream, called malicious stream, and of the functions implemented by the at least one virtualized network function impacted by the attack.

The processing method makes it possible, from an anomaly for example (e.g. data packets not conforming to an expected packet type) of the incoming stream, to detect that a network attack is in progress, and to implement processing operations aiming to re-establish the normal operation of the attacked network service. These attacks are for example attacks of "service theft" type or even of "information theft" type. An attack of "service theft" type consists more specifically in exploiting a fault in the service supported by the cloud network infrastructure, in order to derive therefrom an advantage for an attacker, such as, for example the delivery of content free of charge in the context of a paying content delivery service. An attack of "information theft" type consists also in exploiting a security fault but, unlike an attack of "service theft" type, this fault is located in an operating system, or an application implemented on a server that is the object of the attack. Such an attack is likely to have very heavy consequences on the infrastructure hosting the attacked network service as a whole if it is not dealt with rapidly. An attack of "information theft" type can in fact make it possible, in certain cases, to take complete control of one or more entities of the network providing the attacked network service. The method makes it possible to counteract such attacks by dynamically modifying the sequence of virtualized network functions associated with the network service that is the object of the attack.

The method thus makes it possible to redirect a malicious incoming stream (user stream or stream transmitted by the author of the attack) relating to a network service to healthy virtualized network functions capable of processing the malicious stream.

According to a particular feature, the method further comprises a sending of a notification that the initial sequence has been modified, to an orchestration entity, the entity ordering a routing of the incoming stream to the at least one curative function as a function of a type of the incoming stream.

The network services offered in a cloud network infrastructure are limited to a catalog of network services that are predefined and maintained by an orchestration entity, called NFVO (Network Functions Virtualization Orchestrator) entity. By notifying the latter entity that the initial sequence has been modified, the method allows for an instantaneous update of the catalog of network services. Subsequent requests relating to the network service targeted by the attack are thus, if necessary, directly oriented to a network service that is not corrupted and formed by virtualized network functions capable of processing a malicious stream.

The routing as a function of the type of incoming stream further makes it possible to route the malicious stream to virtualized network functions that are specialized by stream type. The processing of a malicious stream is thus accelerated, only the processing operations that are relevant for a type of stream concerned being applied.

Furthermore, the differentiation by stream type, when several incoming streams are transmitted to the attacked network service, but only certain types of stream are malicious, makes it possible to route only the latter to the so-called curative functions.

According to a particular feature, the sequence modification consists of a reconfiguration of the connectivity of the virtualized network functions of the sequence.

The method makes it possible to respond to the attacks by simple reconfiguration of the connection points (or CP) between virtualized network functions. The method thus makes it possible to provide a rapid real-time and simple response to an attack. The reconfiguration is also decided locally and of local reach. The implementation of the method is moreover facilitated in as much as the modification of the sequence is a simple reconfiguration.

According to a particular feature, the virtualized network function impacted by the attack comprises at least one corrupted component, the curative function implementing only the functions implemented by the at least one corrupted component of the virtualized network function impacted by the attack.

By isolating only the components of the sequence which are corrupted, the method is accelerated. When only a minor component of a virtualized network function is impacted by the attack, there is indeed no need to implement all the components of a virtualized network function, the healthy components of the function being advantageously reused in the new sequence.

This reuse of the healthy components of a virtualized network function impacted by an attack also allows for a saving on the resources of the cloud infrastructure hosting the service. Only the components that require processing are in fact substituted.

According to a particular feature, the method according to further comprises:

a validation by an orchestration entity of the sequence modification before routing of the malicious incoming stream to the curative virtualized network function;

a complementary preventive and/or curative processing of the malicious incoming stream by the orchestration entity as a function of a type of the attack.

The processing of the malicious stream by an orchestration entity makes it possible to adapt the response to an attack according to the type of that attack. This is particularly advantageous in the case of virtualized network functions managed for example by different equipment vendors, each equipment vendor being likely to apply these own measures following the attack through, in particular, the VNF manager.

According to a second aspect, the invention relates to a virtualized resource management entity, managing at least one virtualized network function of a sequence, called initial sequence, of virtualized network functions processing an incoming stream and forming a network service. The entity comprises:

a reception module, arranged to receive a notification that a network attack relating to the network service has been detected;

a control module, arranged to order an identification in the initial sequence of at least one virtualized network function impacted by the attack;

a sequence processing module, arranged to modify the initial sequence such that an incoming stream, called malicious stream, is routed to at least one curative virtualized network function implementing a processing of the malicious stream and of the functions implemented by the at least one virtualized network function impacted by the attack.

According to a particular feature, the control module of the virtualized resource management entity is also arranged to order a routing of the malicious incoming stream to the at least one curative virtualized network function as a function of the type of the malicious incoming stream.

According to a third aspect, the invention relates to a system for processing a network service supported by a virtualized network infrastructure, the network service being formed by a sequence, called initial sequence, of at least one virtualized network function processing an incoming stream. The system comprises:

a virtualized resource management entity according to the second aspect;

an orchestration entity comprising:

a validation module arranged to validate a sequence modification processed by the virtualized resource management entity, before routing of a malicious incoming stream to a curative virtualized network function;

a preventive and/or curative processing module arranged to implement a complementary processing of the malicious incoming stream as a function of a type of attack.

According to a particular feature, the system also comprises a security module arranged to identify in the initial sequence at least one virtualized network function impacted by the attack.

The advantages stated for the processing method according to the first aspect can be directly transposed to the processing system according to the third aspect.

According to a fourth aspect, the invention relates also to a program comprising program code instructions intended to control the execution of the steps of the method described previously, when said program is executed on a computer and a computer-readable storage medium on which is stored a computer program comprising program code instructions for the execution of the steps of the method described previously.

BRIEF DESCRIPTION OF THE DRAWINGS

The invention will be better understood from the following description of particular embodiments, with reference to the attached drawings in which.

DETAILED DESCRIPTION OF ILLUSTRATIVE EMBODIMENTS

Figure 1:
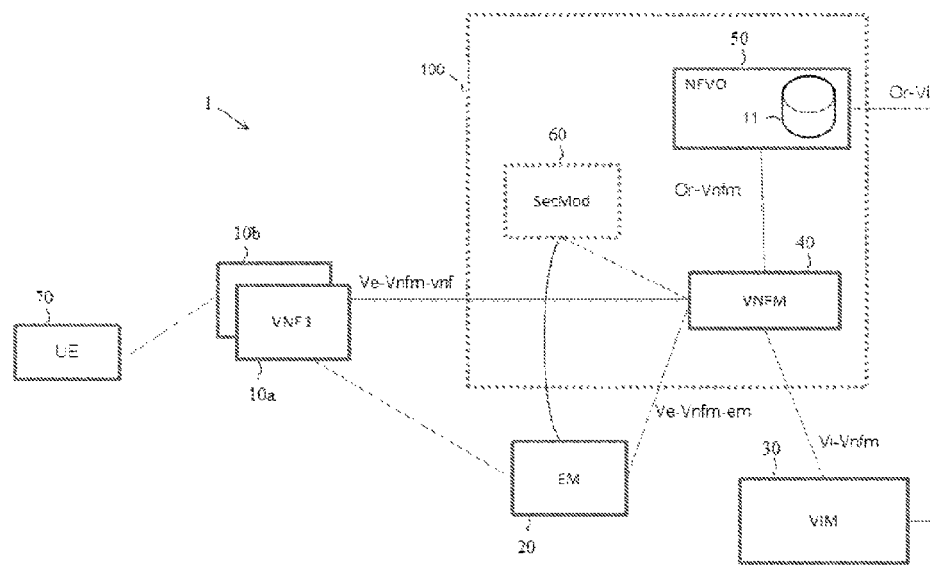
FIG. 1 is a simplified representation of a cloud network infrastructure according to a particular embodiment.

FIG. 1 represents a system 100 for processing a network service supported by a network infrastructure allowing the virtualization of network functions according to a particular embodiment. The system 100 comprises a virtualized resource management entity 40 and an orchestration entity 50. Optionally, the system 100 also comprises a security module 60.

The orchestration entity 50 is more particularly responsible for controlling the virtualized resource management entities 40 and the virtualized infrastructure management entities 30 of the communication network 1 in which the system 100 is implemented. The orchestration entity 50 has a catalog 11 of network services. This catalog 11 is for example a database arranged to store network services and sequences of at least one virtualized network function corresponding to these services. The catalog specifies in particular a predefined operational behavior of the virtualized network functions on which the network services of the catalog 11 rely, and the resources necessary (e.g. number of virtual machines, memory, bandwidth, latency) in order to deploy these functions and implement the network services of the catalog. The virtualized network functions are described by virtualized network function descriptors (or, in English, "VNF descriptors" for "Virtual Network Function descriptor") as defined by the ETSI. The virtualized network functions correspond to functions provided by the operator of the communication network 1 to process a data packet transmitted for example from a user terminal 70. They are, by way of nonlimiting example, network address translation and firewall services, load distribution, transcoding, caching, request optimization or even network packet enrichment services.

According to the NFV architecture defined in the ETSI specification document "GS NFV-MAN 001" published in December 2014, when a network service of the catalog 11 is implemented in the communication network 1, the orchestration entity 50 addresses the virtualized resource management entities responsible for managing the virtualized network functions of the sequence of at least one virtualized network function forming this network service. Each virtualized resource management entity is associated with at least one virtualized network function of the sequence. The role of a virtualized resource management entity is more particularly to manage the life cycle of a virtualized network function, that is to say its creation, its implementation and its termination. The virtualized network functions are, to this end, installed on virtual machines (see above) created and managed by a virtualized infrastructure management entity 30. A virtualized resource management entity receives, from a virtualized network function under its responsibility, error management, configuration, usage, performance and security information relating to this virtualized network function called "FCAPS" ("Fault, Configuration, Accounting, Performance Security") information. This information is managed by an EM (Element Management) management function 20 as described in the ETSI document in section 5.5.1. It notably allows a virtualized resource management entity to adapt the resources assigned to a virtualized network function. As an example, the virtualized resource management entity 40 is responsible for managing the virtualized network functions 10a and 10b. These virtualized network functions 10a-b for example handle the functions of a proxy web server.

The system 100 also comprises a security module 60. The security module 60 makes it possible to identify an attack as described in patent application US2015/0033340 entitled "Systems and methods for self-tuning network intrusion detection and prevention" dated 23 Jul. 2014. A network attack is more specifically identified from a malicious stream in which a known pattern is identified (e.g. source of the attack which is not trusted, random packets, inconsistent TCP "Transmission Control Protocol" sequences).

The communications between the virtualized resource management entity 40, the virtualized infrastructure management entity 30 and the virtualized network functions 10a-b of the communication network 1 are performed via interfaces as defined in the specification document "GS NFV-MAN 001". More specifically, the virtualized resource management entity 40 communicates with the virtualized network function 10a and with the virtualized network function 10b via interfaces Ve-Vnfm-vnf. The virtualized resource management entity 40 communicates also with the virtualized infrastructure management entity 30 via an interface Vi-Vnfm. The communication between the orchestration entity 50 and the virtualized resource management entity 40 is handled by an interface Or-Vnfm.

Only one virtualized resource management entity 40 is represented, but there is no limitation as to the number of virtualized resource management entities implemented to provide a network service. Furthermore, in another embodiment, just as a virtualized resource management entity 40 is likely to manage several virtualized network functions, a virtualized network function is likely to be managed by one or more virtualized resource management entities.

Only two virtualized network functions 10a-b are represented, but there is no limitation as to the number of virtualized network functions of the sequence of virtualized network functions forming a network service.

Figure 2A:
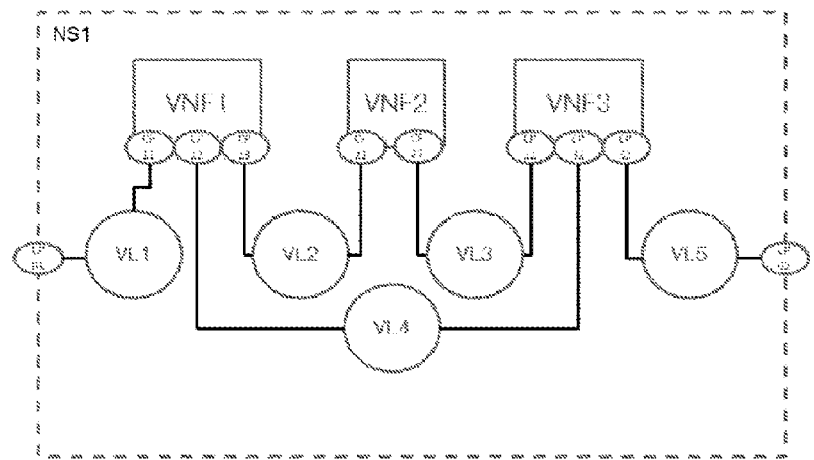
FIGS. 2a and 2b represent a network service respectively before and after implementation of the processing method according to a particular embodiment.
Figure 2B:
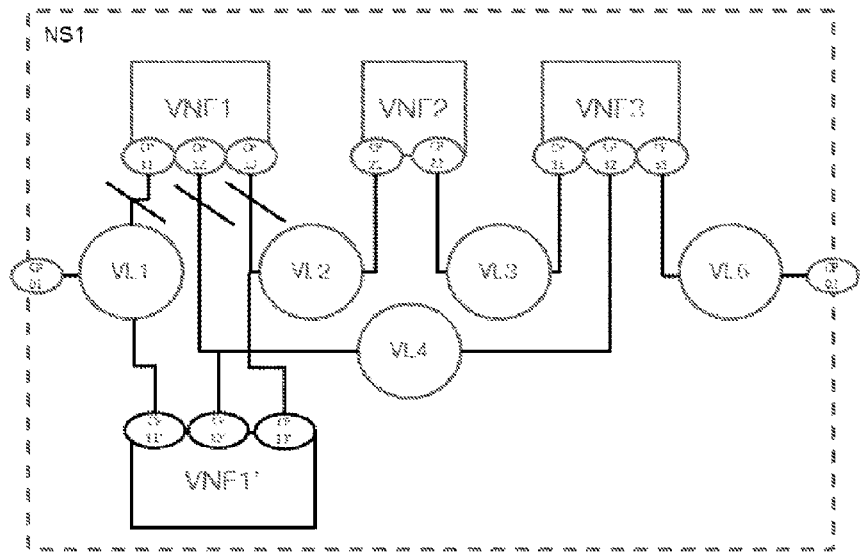

FIGS. 2a and 2b represent a network service NS1 respectively before and after implementation of the processing method according to a particular embodiment.

The network service NS1 comprises three virtualized network functions VNF1, VNF2 and VNF3. The network service NS1 processes one or more incoming streams received at the connection point CP01, the input point of the network service NS1, and returns the stream or streams once processed to the connection point CP02, the output point of the network service NS1. The connection points CP01 and CP02 are also called delivery point and termination point of the network service NS1. The connection points are more generally defined as input/output points. They are, depending on the case, input/output points of a virtualized network function, or of a network service.

FIGS. 2a and 2b correspond more particularly to a graph (called "Forwarding Graph") modeling the relationships between the virtualized network functions VNF1, VNF2 and VNF3. These relationships are modeled by Virtual Links (according to the NFV terminology) linking the virtualized network functions by connection points.

The description of the virtual links also comprises quality of service characteristics such as the desired bandwidth, the latency, or even the jitter (see document "GS NFV-MAN 001", section 6.4.1).

As an example, in the embodiment described in relation to FIG. 2a, the network service NS1 in its initial configuration is formed by a sequence of three virtualized network functions VNF1, VNF2 and VNF3. The virtualized network function VNF1 comprises three connection points CP11, CP12 and CP13; the virtualized network function VNF2 comprises two connection points CP21 and CP22; and the virtualized network function VNF3 comprises three connection points CP31, CP32 and CP33. The connection point CP11 of the virtualized network function VNF1 is linked to the input point CP01 of the network service NS1 by the virtual link VL1. The connection point CP33 of the virtualized network function VNF3 is linked to the output point CP02 of the network service NS1 by the virtual link VL5. The virtualized network function VNF1 is also linked to the virtualized network functions VNF2 and VNF3 respectively by a virtual link VL2 between the connection points CP13 and CP21, and by a virtual link VL4 between the connection points CP12 and CP32. Likewise, the virtualized network functions VNF2 and VNF3 are linked by a virtual link VL3 between the connection points CP22 and CP31.

FIG. 2b illustrates the same network service NS1, described previously in relation to FIG. 2a, after the sequence of network functions VNF1, VNF2 and VNF3 has been reconfigured in response to a network attack according to a processing method which will be described later in relation to FIG. 3. The virtualized network function VNF1 is, according to this processing method, identified in the initial sequence impacted by the network attack. The sequence of virtualized network functions is then reconfigured in order to isolate the virtualized network function VNF1 and to route the streams intended for this latter function to a virtualized network function VNF1', called curative function, implementing a processing of the stream and of the functions implemented by the virtualized network function VNF1. The reconfiguration of the sequence of virtualized network functions is performed by a virtualized resource management entity VNFM 40 managing the virtualized network function VNF1 and consists more specifically in reconfiguring the virtual links comprising connection points belonging to the virtualized network function VNF1 impacted by the network attack, namely the virtual links VL1, VL2 and VL4. After reconfiguration, the sequence forming the network service NS1 is made up of the virtualized network functions VNF1', VNF2 and VNF3. The virtualized network function comprises three connection points CP11', CP12' and CP13'. The virtual links VL1, VL2 and VL4 are reconfigured and respectively link the connection point CP11' to the connection point CP01, the connection point CP13' to the connection point CP21, and the connection point CP12' to the connection point CP32. The virtual links VL3 and VL5 are unchanged.

Figure 3:
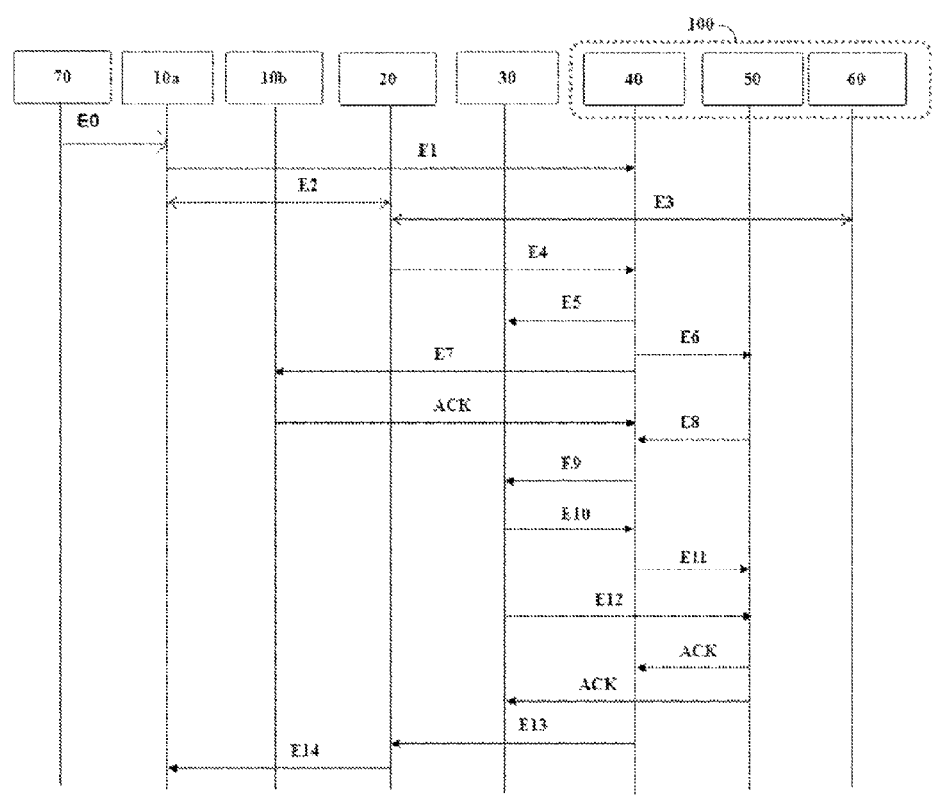
FIG. 3 represents a flow diagram of the processing method, and of the exchanges between equipment items implementing the method, according to a particular embodiment.

FIG. 3 represents a flow diagram of the processing method, and of the exchanges between entities implementing the method, according to a particular embodiment. Hereinafter, a network configuration such as that described in relation to FIG. 1 is assumed.

In a step E0, the terminal 70 sends an HTTP (HyperText Transfer Protocol) request to the virtualized network function VNF1 10a. The virtualized network function VNF1 10a corresponds for example to a web proxy function, called "initial function" of a sequence S of at least one virtualized network function forming a network service NS1 of the catalog of network services 11 of the orchestration entity NFVO 50. The HTTP request constitutes an incoming stream for the network service NS1. It is assumed hereinbelow that this incoming stream includes malicious data packets constituting a network attack targeting the network service NS1.

In a step E1, the virtualized network function VNF1 10a triggers an alarm signaling an anomaly to the virtualized resource management entity VNFM 40.

In a step E2, the anomaly is also detected by the management function EM 20 of the virtualized network function VNF1 10a.

In a step E3, the management function EM 20 of the virtualized network function VNF1 10a addresses the security module 60 in order to determine and identify, if necessary, a network attack on the basis of the anomaly detected in the incoming stream. The message sent to the security module comprises in particular an identifier of the virtualized network function for which an anomaly has been detected, and an identifier of the point of presence hosting this virtualized network function. The security module 60 identifies, from the incoming stream, that a network attack is in progress, the incoming stream is then called "malicious", and returns to the management function EM 20 a response indicating the type of attack undergone by the network service NS1. As an example, the attack undergone is an attack of DDoS (Distributed Denial of Service) type.

In a step E4, the management function EM 20 of the virtualized network function VNF1 10a notifies the virtualized resource management entity VNFM 40 of the attack by specifying the virtualized network function targeted by the attack and the point of presence where the attack is located.

In a step E5, the virtualized resource management entity VNFM 40 orders the virtualized infrastructure management entity VIM 30 to implement the connectivity with a virtualized network function VNF1' 10b, called curative function, capable of implementing a processing of the malicious stream and of the functions implemented by the virtualized network function VNF1 10a impacted by the network attack.

In a step E6, the virtualized resource management entity VNFM 40 informs the orchestration entity 50 that the virtualized network function VNF1 10a is undergoing a network attack by specifying in particular the type of virtualized network function impacted and the point or points of presence affected by the attack.

In a step E7, the virtualized resource management entity VNFM 40 requests the activation of the connection points of the virtualized network function VNF1' 10b in order to route the traffic coming from the virtualized network function VNF1 10a to the function VNF1' 10b. The virtualized network function VNF1' 10b, once its connection points are activated, responds to the virtualized resource management entity VNFM 40 with an acknowledgement message.

In a step E8, the orchestration entity 50 validates the sequence modification initiated in the step E5 and the routing of the traffic to the virtualized network function VNF1' 10b.

In a step E9, the virtualized resource management entity VNFM 40 asks the virtualized infrastructure management entity VIM 30 to configure the virtual links between the connection points of the virtualized network function VNF1' 10b and the connection points of the virtualized network functions to which the virtualized network function VNF1 10a of the initial sequence of virtualized network functions forming the network service NS1 was connected. The routing of the traffic intended for the old virtualized network function VNF1 10a is then immediately redirected via the newly configured virtual links to the virtualized network function VNF1' 10b. The virtualized network function 10b is in particular provided, in addition to the functions specific to the virtualized network function VNF1 10a, with deep packet inspection functions (DPI functions) and firewall functions, in order to process the malicious stream and thus block the attack. It is assumed in the present embodiment that the simple rerouting of the traffic to the virtualized network function VNF1' 10b is sufficient to deal with the attack. The traffic intended for the service NS1 can thus advantageously be maintained without disruption of the service NS1.

In a step E10, the virtualized infrastructure management entity VIM 30 notifies the virtualized resource management entity VNFM 40 that the connection points and the virtual links have been updated.

In a step E11, the virtualized resource management entity VNFM 40 notifies the orchestration entity 50 that the graph associated with the network service NS1 has been modified in order to take account of the new sequence of virtualized network functions. This new sequence corresponds to the sequence of virtualized network functions previously described in relation to FIG. 2b. The orchestration entity 50 then updates its catalog 11 of network services for the network service NS1.

In a step E12, as in the step E10, the virtualized infrastructure management entity VIM 30 notifies the orchestration entity 50 that the connection points and the virtual links have been updated.

The notifications sent in the steps E11 and E12 are acknowledged by the orchestration entity 50.

Then, in a step E13, the virtualized resource management entity VNFM 40 notifies the management function EM 20 of the virtualized network function VNF1' 10b of the reconfiguration of the graph associated with the network service NS1. This notification leads to a so-called "post-configuration" operation and is necessary in the case where the routing of the incoming stream is dependent on the stream processed by the VNF1' 10b. In another embodiment, this post-configuration for example allows the virtualized network function VNF1' 10b to differentiate the routing of an incoming stream according to its nature. Only the streams corresponding to a service benefiting from a high quality of service are for example routed at the order of the orchestration entity 50 to the virtualized network function VNF1' 10b.

In a step E14, the virtualized network function VNF1 10a is destroyed.

In another embodiment, the corrupted components of the virtualized network function VNF1 10a impacted by the network attack are identified (for example using the security module 60). The virtualized network function VNF1' 10b then implements only the functions implemented by the corrupted components of the virtualized network function impacted by the attack.

In another embodiment, the orchestration entity 50, after validation of the modification of the sequence of virtualized network functions forming the network service NS1, implements a complementary preventive and/or curative processing of the malicious incoming stream.

In another embodiment, the anomaly is detected by the virtualized resource management entity VNFM 40 which supervises the attacked virtualized network function VNF1 10a, or by the orchestration entity 50 responsible for the impacted network service NS1.

In another embodiment the functions for processing the malicious stream and the functions implemented by the virtualized network function VNF1 10a impacted by the network attack implemented by the virtualized network function VNF1 10a are handled by two distinct virtualized network functions.

Figure 4:
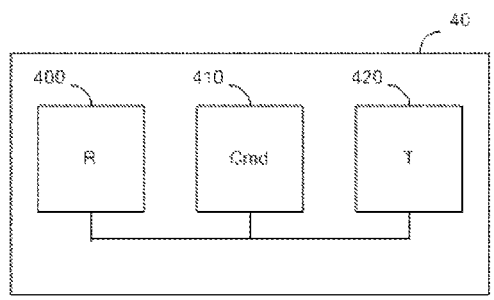
FIG. 4 represents a virtualized resource management entity according to a particular embodiment.

FIG. 4 represents a virtualized resource management entity 40 managing at least one virtualized network function of a sequence, called initial sequence, of virtualized network functions processing an incoming stream and forming a network service. The virtualized resource management entity comprises:

- a reception module 400, arranged to receive a notification that a network attack relating to the network service has been detected, the attack consisting of a malicious incoming stream;
- a control module 410, arranged to order an identification in the initial sequence of at least one virtualized network function impacted by the attack;
- a sequence processing module 420, arranged to modify the initial sequence such that the malicious incoming stream is routed to at least one virtualized network function, called curative function, implementing a processing of the malicious stream and of the functions implemented by the at least one virtualized network function impacted by the attack.

In another embodiment, the control module is also arranged to order a routing of the malicious incoming stream to the at least one curative virtualized network function as a function of the type of the malicious incoming stream.

The invention is implemented by means of software and/or hardware components. In this respect, the term "module" can in this document correspond equally to a software component and to a hardware component, or to a set of hardware and/or software components, capable of implementing a function or a set of functions, according to what is described previously for the module concerned.

A software component corresponds to one or more computer programs, one or more sub-programs of a program, or more generally to any element of a program or of a piece of software. Such a software component is stored in memory then loaded and executed by a data processor of a physical entity and is likely to access the hardware resources of this physical entity (memories, storage media, communication bus, input/output electronic boards, user interfaces, etc.).

Likewise, a hardware component corresponds to any element of a hardware assembly. It can be a programmable or non-programmable hardware component, with or without integrated processor for software execution. It is for example an integrated circuit, a chip card, an electronic circuit board for executing firmware, etc.

In a particular embodiment, the modules 400, 410 and 420 are arranged to implement the processing method described previously. They are preferably software modules comprising software instructions for executing those of the steps of the processing method previously described that are implemented by a virtualized resource management entity. The invention therefore also relates to:

- a program for a virtualized resource management entity, comprising program code instructions intended to control the execution of the steps of the processing method described previously, when said program is executed by said entity;
- a storage medium that can be read by a virtualized resource management entity on which is stored the program for such an entity.

The software modules can be stored in or transmitted by a data medium. The latter can be a hardware storage medium, for example a CD-ROM, a magnetic diskette or a hard disk, or even a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A method comprising:
processing a network service supported by a network infrastructure of a network allowing virtualization of network functions, said network service being formed by a sequence, called initial sequence, of at least one virtualized network function processing an incoming stream, said processing comprising the following acts performed by a virtualized resource management device in the network:
detecting an anomaly relating to said at least one virtualized network function;
detecting and identifying a network attack targeting said network service on the basis of said anomaly;
identifying in said initial sequence of at least one virtualized network function impacted by said attack;
modifying said initial sequence to circumscribe the attack such that said incoming stream is routed to at least one virtualized network function, called curative function, implementing a processing of said incoming stream, called malicious stream, and of the functions implemented by said at least one virtualized network function impacted by said attack;
validating by an orchestration entity said sequence modification before routing said malicious stream to said curative function; and
performing a complementary preventive and/or curative processing of said malicious stream by said orchestration entity as a function of a type of said attack.

2. The method as claimed in claim 1, also comprising sending a notification that said initial sequence has been modified, to the orchestration entity, said orchestration entity ordering a routing of said incoming stream to said at least one curative function as a function of a type of said incoming stream.

3. The method as claimed in claim 1, in which said sequence modification comprises reconfiguring connectivity of the virtualized network functions of said sequence.

4. The method as claimed in claim 1, in which the virtualized network function impacted by said attack comprises at least one corrupted component, said curative function implementing only the functions implemented by said at least one corrupted component of the virtualized network function impacted by said attack.

5. A virtualized resource management entity, said entity comprising:
at least one hardware component configured to manage at least one virtualized network function of a sequence, called initial sequence, of virtualized network functions processing an incoming stream and forming a network service, including:
detecting an anomaly relating to said at least one virtualized network function;
detecting and identifying a network attack targeting said network service on the basis of said anomaly;
identifying in said initial sequence at least one virtualized network function impacted by said attack;
modifying said initial sequence such that an incoming stream, called malicious stream, is routed to at least one curative virtualized network function implementing a processing of said malicious stream and of the functions implemented by said at least one virtualized network function impacted by said attack;
sending a notification of the network attack to an orchestration entity for validation of the sequence modification; and
receiving the validation of the sequence modification from the orchestration entity before routing said malicious stream to said at least one curative virtualized network function.

6. The virtualized resource management entity as claimed in claim 5, in which the at least one hardware component is also configured to order a routing of said malicious incoming stream to said at least one curative virtualized network function as a function of the type of said malicious incoming stream.

7. A system for processing a network service supported by a virtualized network infrastructure in a network, said system comprising:
a virtualized resource management entity comprising at least one hardware component configured to:
receive a notification that a network attack relating to said network service has been detected, said network service being formed by a sequence, called an initial sequence, of at least one virtualized network function processing an incoming stream;
order an identification in said initial sequence of at least one virtualized network function impacted by said attack; and
modify said initial sequence such that an incoming stream, called malicious stream, is routed to at least one curative virtualized network function implementing a processing of said malicious stream and of the functions implemented by said at least one virtualized network function impacted by said attack; and
an orchestration entity comprising at least one hardware component configured to:
validate the sequence modification processed by said virtualized resource management entity, before routing the malicious stream to the curative virtualized network function;
implement a complementary processing of said malicious stream as a function of a type of attack.

8. The system as claimed in claim 7 further comprising a security module arranged to identify in said initial sequence at least one virtualized network function impacted by said attack.

9. A non-transitory computer-readable storage medium on which is stored a program comprising program code instructions to control execution of a method for processing a network service when the instructions are executed by a hardware component of a virtualized resource management device in a network, wherein the instructions configure the virtualized resource management device to:
- process the network service, which is supported by a network infrastructure of the network allowing virtualization of network functions, wherein said network service is formed by a sequence, called an initial sequence, of at least one virtualized network function processing an incoming stream, and wherein the processing of the network service comprises:
- detecting an anomaly relating to said at least one virtualized network function;
- detecting and identifying a network attack targeting said network service on the basis of said anomaly;
- identifying in said initial sequence of at least one virtualized network function impacted by said attack;
- modifying said initial sequence to circumscribe the attack such that said incoming stream is routed to at least one virtualized network function, called curative function, implementing a processing of said incoming stream, called malicious stream, and of the functions implemented by said at least one virtualized network function impacted by said attack;
- sending a notification of the network attack to an orchestration entity for validation of the sequence modification; and
- receiving the validation of the sequence modification from the orchestration entity before routing said malicious stream to said curative function.

* * * * *

UNITED STATES PATENT AND TRADEMARK OFFICE
CERTIFICATE OF CORRECTION

PATENT NO. : 10,812,511 B2
APPLICATION NO. : 16/067496
DATED : October 20, 2020
INVENTOR(S) : Nicolas Bihannic et al.

Page 1 of 1

It is certified that error appears in the above-identified patent and that said Letters Patent is hereby corrected as shown below:

In the Claims

In Claim 1, Column 11, Line 38:
Please delete the word "of".

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*